US010419234B2

(12) United States Patent
Ilic

(10) Patent No.: US 10,419,234 B2
(45) Date of Patent: Sep. 17, 2019

(54) SENDING PERSONALIZED NOTIFICATIONS OVER A COMMUNICATION NETWORK

(71) Applicant: Facebook, Inc., Menlo Park, CA (US)

(72) Inventor: Aleksandar Ilic, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 167 days.

(21) Appl. No.: 15/600,358

(22) Filed: May 19, 2017

(65) Prior Publication Data

US 2018/0337798 A1 Nov. 22, 2018

(51) Int. Cl.
| | |
|---|---|
| *H04L 12/18* | (2006.01) |
| *G06F 9/54* | (2006.01) |
| *G06Q 50/00* | (2012.01) |
| *G06Q 30/02* | (2012.01) |

(52) U.S. Cl.
CPC .......... *H04L 12/1895* (2013.01); *G06F 9/542* (2013.01); *G06Q 30/02* (2013.01); *G06Q 30/0267* (2013.01); *G06Q 30/0271* (2013.01); *G06Q 50/01* (2013.01)

(58) Field of Classification Search
CPC ....... H04L 51/066; H04L 51/34; H04L 51/12; H04L 12/1895; G06F 17/30091; G06F 3/04815; G06Q 30/02; G06Q 50/22; G06Q 50/01; G06Q 30/0282; G06N 99/005
See application file for complete search history.

(56) References Cited

U.S. PATENT DOCUMENTS

| | | | | |
|---|---|---|---|---|
| 2008/0046317 | A1* | 2/2008 | Christianson | G06Q 30/02 705/14.44 |
| 2012/0290662 | A1* | 11/2012 | Weber | G06N 99/005 709/206 |
| 2013/0041653 | A1* | 2/2013 | Tseng | G06Q 50/01 704/9 |
| 2014/0289384 | A1* | 9/2014 | Kao | H04L 51/12 709/223 |
| 2015/0039524 | A1* | 2/2015 | Leach | G06Q 30/0282 705/319 |
| 2015/0040036 | A1* | 2/2015 | Crocker | G06F 3/04815 715/757 |
| 2015/0100645 | A1* | 4/2015 | Steinmann | H04L 51/34 709/206 |
| 2015/0149486 | A1* | 5/2015 | Lessin | G06F 17/30091 707/748 |

(Continued)

*Primary Examiner* — Etienne P Leroux
(74) *Attorney, Agent, or Firm* — Baker Botts L.L.P.

(57) ABSTRACT

In one embodiment, a method includes detecting a triggering event for sending a notification to a user of an online social network. The method may also include accessing multiple of versions of the notification. Each version may include one or more template elements of a particular content type. The method may also access user data associated with the user that includes data associated with one or more relationships of the user on the online social network or data associated with actions performed by the user. The method may also include determining a score for each version representing a likelihood of the corresponding version being consumed by the user. The method may also include generating a personalized notification by using the selected version of the notification and replacing each of the template elements of the selected version of the notification with content of the content type associated with the template element.

17 Claims, 6 Drawing Sheets

(56) References Cited

U.S. PATENT DOCUMENTS

2016/0018963  A1*  1/2016  Robbins ................ G06Q 50/22
                                                         715/739
2017/0093766  A1*  3/2017  Nagaralu .............. H04L 51/066

* cited by examiner

SENDING PERSONALIZED NOTIFICATIONS OVER A COMMUNICATION NETWORK

TECHNICAL FIELD

This disclosure generally relates to sending notifications to mobile computing devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a Global Positioning System (GPS) receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a notification system may deliver notifications to a user in an engaging manner. The notifications may be generated by a notification engine using a notification template. The notification template may include one or more input fields that may each be populated with a template element. Template elements may include tags (e.g., references to entities on an online social network), actions taken by a particular user (e.g., posted, liked, sent, shared), context items (e.g., the content of a snippet of a post, the time a user posted, the location of a user's post), prompts (e.g., "reply 1 to wish Happy Birthday," "check out [George's new video]," "click to view"), references to content objects (e.g., a photo, a thumbnail of a photo or video, a link), destination of the notification or medium through which the notification is surfaced to the user (e.g., to a landing page associated with the user such as newsfeed, timeline, or story), and a preferred language of the user for translation purposes. In particular embodiments, the notification engine may determine which template elements to send to a first user for a given notification by using a machine-learning model. The machine-learning model may take as input user data of the first user. The user data may include data associated with one or more relationships of the first user on the online social network or data associated with actions performed by the first user on the online social network. Such information may be stored in a social graph associated with the first user. The machine-learning model may also take as input template elements from two or more versions of a notification. The notification engine may, using the machine-learning model, determine a score for each of the versions of the notification. The score may be based on the two inputs: the user data, and the template elements for that particular version of the notification.

As an example and not by way of limitation, the notification engine may determine to send a user, Jerry, a notification about his friend George, who just posted a message in a group called "Monk's Cafe." The notification engine may generate two versions of the notification. The first version may state, "Jerry, George just posted in Monk's Cafe." The second version may state, "Jerry, George posted in Monk's Cafe, 'has anyone tried the hash browns? I think they gave me . . .'" Using the machine-learning model, the notification engine may determine a score for each version. The score may reflect a probability that the receiving user (e.g., Jerry) will interact positively with the associated version of the notification. The notification engine may then select a version of the notification to send to Jerry based on the scores.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a notification system may deliver notifications to a user in an engaging manner. The notifications may be generated by a notification engine using a notification template. The notification template may include one or more input fields that may each be populated with a template element. Template elements may include tags (e.g., references to entities on an online social network), actions taken by a particular user (e.g., posted, liked, sent, shared), context items (e.g., the content of a snippet of a post, the time a user posted, the location of a user's post), prompts (e.g., "reply 1 to wish Happy Birthday;" "check out [George's new video]," "click to view"), and references to content objects (e.g., a photo, a thumbnail of a photo or video, a link). In particular embodiments, the notification engine may determine which template elements to send to a first user for a given notification by using a machine-learning model. The machine-learning model may take as input user data of the first user. The user data may include data associated with one or more relationships of the first user on the online social network or data associated with actions performed by the first user on the online social network. Such information may be stored in a social graph associated with the first user. The machine-learning model may also take as input template elements from two or more versions of a notification. The notification engine may, using the machine-learning model, determine a score for each of the versions of the notification. The score may be based on the two inputs: the user data, and the template elements for that particular version of the notification.

As an example and not by way of limitation, the notification engine may determine to send a user, Jerry, a notification about his friend George, who just posted a message in a group called "Monk's Cafe." The notification engine may generate two versions of the notification. The first version may state, "Jerry, George just posted in Monk's Cafe." The second version may state, "Jerry, George posted in Monk's Cafe, 'has anyone tried the hash browns? I think they gave me . . .'" Using the machine-learning model, the notification engine may determine a score for each version. The score may reflect a probability that the receiving user (e.g., Jerry) will interact positively with the associated version of the notification. The notification engine may then select a version of the notification to send to Jerry based on the scores. In particular embodiments, the notification engine may be associated with a social-networking system. In particular embodiments, the social-networking system may perform some or all of the functions described as being performed by the notification engine. In particular embodiments, the notification engine may perform some or all of the functions described as being performed by the social-networking system.

Figure 1:
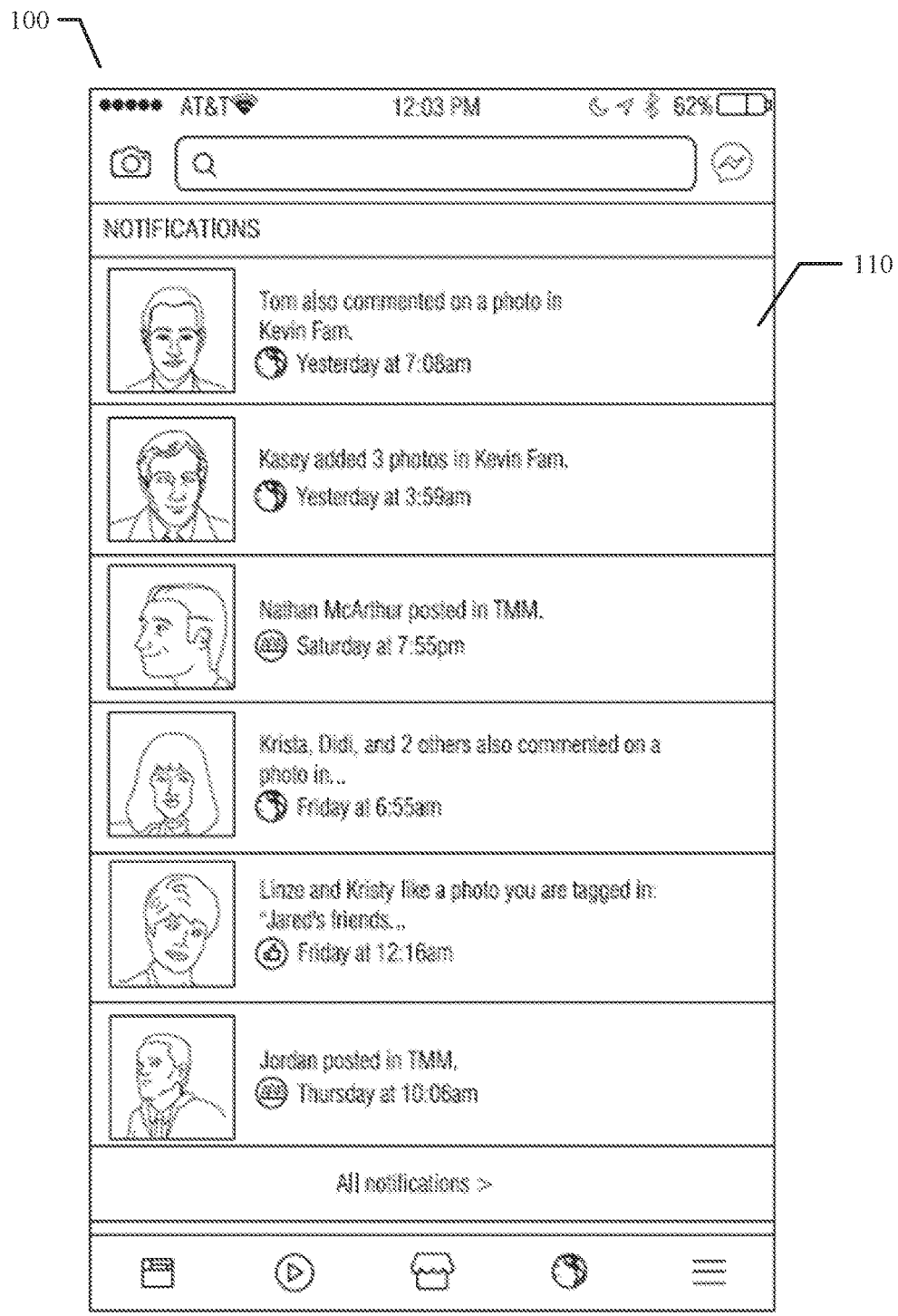
FIG. 1 illustrates an example notification interface.

FIG. 1 illustrates an example notification interface 100. Notification interface 100 may be an interface that is displayed on a user's mobile device when she selects an icon associated with notification. In particular embodiments, notification interface 100 may be an interface that is displayed while the mobile device is in the locked state. Although a particular notification interface is shown, this disclosure contemplates any suitable notification interface, including a notification interface design for a desktop computer screen, virtual reality interface, or a tablet screen. Notification interface 100 may include one or more notifications 110. Notifications 110 may be notifications that have been sent by a social-networking system, communication network, notification engine, or any suitable entity. In particular embodiments, a communication network may be a social-networking system. Notifications 110 may be notifications of activity that has been performed by users on an online social network. As an example and not by way of limitation, the social-networking system may send a notification to a user, Kevin, that another user, Tom, has commented on a photo that was posted to a group that Kevin and Tom both belong to. The notification may state: "Tom also commented on a photo in Kevin Fam." Although this disclosure describes a particular notification interface with particular notifications, this disclosure contemplates any suitable notification interface and any suitable notifications.

Figure 2:
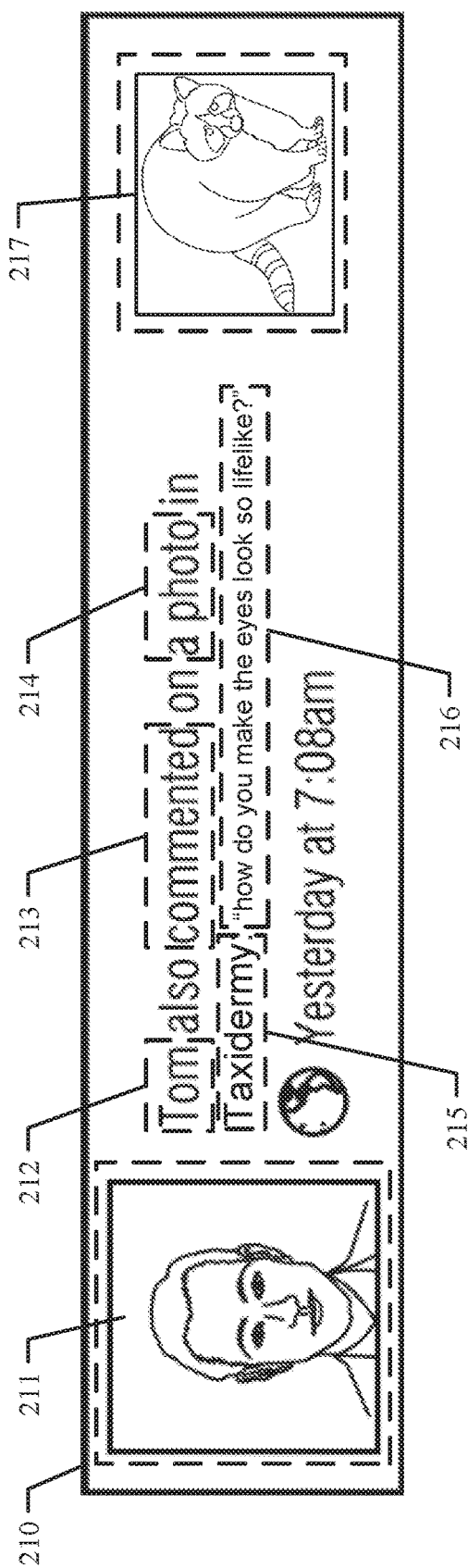
FIG. 2 illustrates an example notification with example content items.

FIG. 2 illustrates an example notification 210 with example content items 211-217. In the example of FIG. 2, notification 210 may be a message sent from the social-networking system in response to a triggering event. The triggering event may have been, for example, a user Tom commenting on a photo in a group called "Taxidermy." In response to the triggering event, the social-networking system may send notification 210 to users who belong to the Taxidermy group. Notification 210 may include several content items, such as, but not limited to, actor photo 211 (e.g., a thumbnail photo of the user whose action triggered the notification), actor name 212, action 213 (e.g., commented on, liked, posted in, shared), content object type 214 (e.g., photo, video, link, post), location 215 (e.g., group, timeline, fan page), context item 216 (e.g., a snippet of a post or comment), and content object media 217 (e.g., a thumbnail photo of a photo or video associated with the notification, a GIF, a video). Each of these content items may have a respective content type. In particular embodiments each template element may be associated with a content type. As an example and not by way of limitation, the template element <User Name> may be associated with a user content type. Likewise, the template element <Actor Name> may be associated with the user content type. The template element <action> may be associated with a string content type. The <Context1> and <Context2> template elements may be associated with a string content type, a photo content type, a post content type, a video content type, or any other suitable content type. Although this disclosure describes a particular notification having a particular set of features, this disclosure contemplates any suitable notification having any suitable number of features.

In particular embodiments, a notification engine may be maintained and operated by a communication system. The notification engine may generate notifications and may send those notifications to users of an online social network associated with the communication system. The communication system may be a social-networking system. A notification may be a message sent by the notification engine or by the communication system that notifies a user of some activity that has occurred on the online social network. As an example and not by way of limitation, a notification may be sent to a user when the user's friend posts content to the online social network. As another example and not by way of limitation, a user, Alex, may belong to a group on the online social network called "Taxidermy." Another member of the Taxidermy group my post a photo to the group of a recent taxidermy project. In response, the notification engine may send Alex a notification to alert Alex of the recently uploaded photo. The act of posting a photo to a group may be understood to qualify as a "triggering event." In particular embodiments, the social-networking system may detect a triggering event for sending a notification to a first user of an online social network. A triggering event may be an event that occurs over the online social network and that prompts a notification to be sent to one or more users. Examples of triggering events may include posting a photo to a group (as discussed above), sending a friend request to a user, tagging a user in a photo or post, posting a status update, or any other suitable action. Once a triggering event has been detected, the social-networking system may determine to whom to send the notification regarding the triggering event. In particular embodiments, the social-networking system may send the notification to one or more users who may have an interest in the action that triggered the notification. As an example and not by way of limitation, a user may post to a group, and the social-networking system may send a notification of the post to the members of that group. As another example and not by way of limitation, a user may like a page on the online social network that is associated with the celebrity Katy Perry. Later, Katy Perry may announce a new tour and may post details of the tour on the page. The social-networking system may determine to send the user a notification of the new tour. In connection with sending notifications to users, particular embodiments may utilize one or more systems, components, elements, functions, methods, operations, or steps disclosed in U.S. patent application Ser. No. 14/567,218, entitled "User Aware Notification Delivery" and filed 11 Dec. 2014. U.S. patent application Ser. No. 14/567,218 is hereby incorporated by reference in its entirety.

In addition to determining to whom to send the notification, the social-networking system may also determine what the notification will say. Continuing the above example about the celebrity Katy Perry, the social networking system may generate a notification for a user, Jacob, that states: "Jacob, Katy Perry is touring near you soon," or the notification may state, "Jacob, Katy Perry just posted on her fan page. Check it out!" The information that is included in the notification may be different for different users. The reason it may be different for different users may be because different users may react differently to notifications depending on the notification's information. As an example and not by way of limitation, some users may respond positively to a notification that includes a snippet of the post or comment that triggered the notification (e.g., those users may wish to have a preview of the notification), but other users may respond negatively to such a notification (e.g., those users may be overwhelmed by an excessive amount of text in the notification). The social-networking system may determine, through use of the notification engine and a machine-learning model, what information to include in the notification for a particular user. The determination may be made by using a machine-learning model and may be based on user data and template elements associated with the notification.

In particular embodiments, the social-networking system may, in response to detecting a triggering event for sending a notification to a user, access several versions of the notification. Each version may comprise one or more template elements. Each template element may be associated with a content type. A template element may be a word, string of characters, metadata, a content object, or a reference to a content object that may be used in a notification. Template elements may include tags (e.g., references to entities on an online social network), actions taken by a particular user (e.g., posted, liked, sent, shared), context items (e.g., the content of a snippet of a post, the time a user posted, the location of a user's post), prompts (e.g., "reply 1 to wish Happy Birthday;" "check out [George's new video]," "click to view"), and references to content objects (e.g., a photo, a thumbnail of a photo or video, a link). In particular embodiments, a template element may comprise only the category of content that may be used in a notification. As an example and not by way of limitation, a notification template may include the following template elements: <User Name>; <Actor Name>; <Action>; <Context1>, <Context2>; <Prompt>. In particular embodiments, the above notification may be understood to be a version of a notification. This version of a notification may be an example of a version of a notification accessed by the social-networking system in response to detecting a triggering event. Another version of a notification may be <Actor Name>; <Action>; <Context>. These two versions of a notification may correspond to two different notifications which respectively say, "Kevin, Tom commented on a photo in Taxidermy. Check it out," and "Tom commented in Taxidermy." This disclosure mentions two versions of a notification, but the social-networking system may access any number of versions of a notification with any combination of template elements. The versions of the notification may be human-generated or automatically generated by the social-networking system. In particular embodiments each template element may be associated with a content type. As an example and not by way of limitation, the template element <User Name> may be associated with a user content type. Likewise, the template element <Actor Name> may be associated with the user content type. The template element <action> may be associated with a string content type. The <Context1> and <Context2> template elements may be associated with a string content type, a photo content type, a post content type, a video content type, or any other suitable content type. Although this disclosure describes accessing several versions of a notification in a particular manner, this disclosure contemplates accessing several versions of a notification in any suitable manner.

In particular embodiments, the social-networking system may access user data associated with the user to whom the notification will be sent. In particular embodiments, the user data may comprise data associated with one or more relationships of the user on the online social network. Relationships of the user on the online social network may be stored in a social graph associated with the user, as discussed in more detail below. Examples of relationships may include first-degree friends, second-or-more degree friends, family relationships (e.g., spouse, sibling, parent), or any other suitable relationship. Furthermore, relationships may be formed between a user and an entity, such as a business. As an example and not by way of limitation, a user may visit a coffee shop called Nero's, and may check in at the coffee shop via the online social network. This may establish a relationship between the user and Nero's. As another example and not by way of limitation, a user may watch a video associated with NIKE. The act of watching a video associated with NIKE may form a relationship between the user and NIKE, or even between the user and the video associated with NIKE. In particular embodiments, the relationship between users and other users or entities may be represented by edges in the social graph. Just as relationships have different types, the edges in the social graph may also have different types. As an example and not by way of limitation, a user Alex may have a friend relationship with another user, Jane, and may have an "attended" relationship with an entity, New Mexico State University. In particular embodiments, a user may have a stronger relationship with particular users or entities than with other users or entities. The strength of a relationship may be based at least in part on an affinity coefficient between the user and another user or entity. In particular embodiments, as a user repeatedly interacts with another user or entity (e.g., by liking photos, tagging the user/entity, commenting in threads associated with the user/entity), the affinity coefficient between the user and the other user or entity may increase. Although this disclosure describes accessing user data in a particular manner, this disclosure contemplates accessing user data in any suitable manner.

In particular embodiments, the user data may comprise data associated with actions performed by the user on the online social network. The actions performed by the user may be any action the user performs on the online social network, including opening a notification, clicking on an advertisement, watching a video, liking a video, posting content to the online social network, posting a comment associated with a content object, joining a group, leaving a group, following a user, unfollowing a user, or any other suitable action. These actions may be stored by the social-networking system and may also be stored in association with the social graph. As an example and not by way of limitation, a user Alex may receive a notification that states, "Alex, Jane just tagged you in a photo," which includes a thumbnail of the photo. Alex may select the notification to view the photo that he was tagged in, or Alex may dismiss the notification, or Alex may simply ignore the notification. In particular embodiments, Alex may also hide the notification. In particular embodiments, Alex may also specify that he does not wish to see more notifications under one or more circumstances. As an example and not by way of limitation, Alex may specify that he does not wish to see any more notifications from Jane, or any more notifications that are associated with a particular content object on the online social network. If Alex specifies this, the social-networking system may "turn off" notifications for Alex in whatever circumstance he specifies. In particular embodiments, the social-networking system may store the user's actions and also access them. In particular embodiments, the data associated with actions performed by the user on the online social network may comprise actions the user has performed in response to receiving a plurality of notifications from the online social network. These actions may be labeled as "positive" (e.g., selecting the notification, viewing the notification for a threshold amount of time, opening an application associated with the notification) or "negative" (e.g., hiding the notification, ignoring the notification). The social-networking system may store both the information contained in the notification (including which template elements were included in the notification) and information related to the user to whom the notification was sent. As an example and not by way of limitation, a user may ignore a first plurality of notifications sent by the social-networking system, the same user may open a second plurality of notifications sent by the social-networking system, and the same user may hide a third plurality of notifications sent by the social-networking system. The social-networking system may access both the notification information and the actions the user took with respect to the notification, as well as information related to the user that may be stored in a social graph associated with the user. Although this disclosure describes accessing user data in a particular manner, this disclosure contemplates accessing user data in any suitable manner.

In particular embodiments, accessing the user data may comprise accessing a social graph associated with the user to whom the notification will be sent. The social graph may comprise a plurality of nodes and edges connecting the nodes. A first node may correspond to the first user, and one or more second nodes may each correspond to second users, entities, concepts, or content objects that the first user has interacted with or otherwise has a direct or indirect connection to on the online social network. In particular embodiments, each edge between the first node and each second node corresponds to an action the first user has taken with respect to the second user, entity, concept, or content object corresponding to the second node. In particular embodiment, each edge may have a particular edge-type that corresponds to the particular action the first user has taken. As an example and not by way of limitation, a user Alex may watch a video called "Unicycle Racing." A first node may represent Alex and a second node may represent the video "Unicycle Racing." Alternatively or in addition, another second node may represent the entity that posted the video, SUN UNICYCLES. Because Alex watched the video, an edge between Alex's first node and the node corresponding to the video may have a "watched" edge-type. Alternatively or in addition, an edge between Alex's first node and the node corresponding to SUN UNICYCLES may have an edge-type that indicates that Alex watched the "Unicycle Racing" video. Although this disclosure describes accessing a social graph in a particular manner, this disclosure contemplates accessing a social graph in any suitable manner.

In particular embodiments, each relationship of the user to whom the notification will be sent may be represented by a first node corresponding to the user and an edge connecting the first node to a second node. In addition to having an edge-type, in particular embodiments, each edge connecting the first user node to another node may also have an affinity coefficient. The affinity coefficient may represent a strength of a relationship between the user and another user, entity, concept, or content object. The strength of a relationship may be based at least in part on past actions a user has taken with respect to another user, entity, concept, or content object. In particular embodiments, as a user repeatedly interacts with another user, entity, or concept (e.g., by liking photos, tagging the user/entity, commenting in threads associated with the user/entity), the affinity coefficient between the user and the other user, entity, or concept may increase. Although this disclosure describes determining and accessing an affinity coefficient in a particular manner, this disclosure contemplates determining and accessing an affinity coefficient in any suitable manner.

In particular embodiments, the social-networking system may use a machine-learning model to determine a score for each version of the notification that the social-networking system accesses. In particular embodiments, the score may represent a likelihood of the corresponding version of the notification being consumed by the user on the online social network. In particular embodiments, a machine-learning model may be trained with training data. The training data may include user data (e.g., a list of user features) and a list of notification features. The notification features may comprise the template elements discussed above. The user features may comprise user features of a plurality of users of the online social network and may include any suitable user feature, such as age, race, employment status, relationship status, geographic location, educational background, as well as social graph data, such as content objects that users have interacted with (e.g., liked, shared, commented on). The social graph data may also include affinity coefficients between users and other users, content objects, concepts, or any other suitable entity on the online social network, as discussed below. All this information may be referred to as aggregate user data. In particular embodiments, the social-networking system may access global data for notifications that have been previously sent to users of the online social network. This global data may be segmented into "user buckets" (e.g., teens in India), and may be used to estimate how a particular version of a notification may perform in a geographic area where there is insufficient data. As an example and not by way of limitation, the social-networking system may have sufficient data for a particular notification that was sent to teenagers in India. When determining whether to send the same version of a notification to a teenager in the United States, the social-networking system may access the global data for the notification that was sent to teenagers in India to estimate how well the version of the notification may perform in the United States. Based on this estimation, the social-networking system may determine whether to send the notification to the teenager in the United States. As another example and not by way of limitation, a particular version of a notification may receive a relatively high engagement by teenagers in India. This version may include a particular set of template elements that may be different from other versions of the notification. Because this particular version performs so well among teenagers in India, the social-networking system may determine that similar versions of different notifications may also perform well among teenagers in India. Two versions of the different notifications may be similar if they include the same or substantially the same template elements. The content of those template elements may be different, obviously, but they may share the same or substantially the same template elements. Although this disclosure training a machine-learning model in a particular manner, this disclosure contemplates training a machine-learning model in any suitable manner.

In particular embodiments, the notification features may include any suitable template element of the notification, including <user name>, <actor name>, <action>, <content object><social network location> (e.g., group, timeline, fan page), <geographic location> (e.g., the geographic location where the triggering action occurred), <context item>, or any other suitable feature of the notification, including the relative placement of these elements. The training data may also be labeled by whether a particular user has clicked on or otherwise interacted with the particular notification. As an example and not by way of limitation, a click-through of a notification may be labeled as "1," and if the user hides or ignores the notification, that may be labeled as "0." A click-through of a notification may occur when the user makes any gesture sufficient to select the notification (e.g., by clicking, tapping, or swiping). In particular embodiments, the label may also be any other indicator of a desired result, such as a user viewing the notification for a threshold amount of time, opening an associated application on a client device after viewing the notification, or any suitable indication of a desired result. In particular embodiments, the label may be a particular combination of template elements that resulted in a desirable outcome (e.g., by opening the notification). In particular embodiments, the machine learning model may use any suitable algorithm to train on, including a regression model, a neural network, or any other suitable algorithm. As an example and not by way of limitation, the algorithm may be a linear regression model of the type $f(x)=w_1A+w_2B+w_3C+ \ldots +w_iZ$, where A, B, C . . . Z are user features and notification features (e.g., template elements) and $w_1, w_2, \ldots w_i$ may be weights for the features that may be determined during training. Although this disclosure describes training a machine-learning model in a particular manner, this disclosure contemplates training a machine-learning model in any suitable manner.

In particular embodiments, the machine-learning model may be trained using data from "lookalike" users with respect to the first user. A lookalike user may be a user who has similar attributes as the first user. The principle here may be that similar users may behave similarly when viewing a particular message. As an example and not by way of limitation, two users, Alex and Brandon, may both be male and may have both interacted with (e.g., liked, viewed, shared, commented on) content objects related to weight-lifting and bodybuilding. Alex and Brandon may be lookalike users. That is, Alex may be a lookalike user with respect to Brandon, and vice versa. Thus, if Brandon has positively interacted with a particular notification with a particular combination of template elements, Alex may be likely to also positively interact with the a notification that has the same or similar combination of template elements. In particular embodiments, the lookalike users may be selected from a plurality of second users. As an example and not by way of limitation, if a user Alex is the first user, the lookalike users may be selected from a group of second users. This group of second users may be all other users on the online social network, or may be a subset of all users (e.g., users who live in North America). In particular embodiments, the first user may correspond to a first user-vector and the plurality of second users correspond to a plurality of second user-vectors, respectively. The social-networking system may determine whether users A and B are lookalike users by representing each user as a user-vector. After the social-networking system has generated user-vectors for two or more users, it may measure the vector similarity (e.g., cosine similarity, Euclidean distance) between two user-vectors to determine if the users may be deemed to be lookalike users. A user may be considered a lookalike user with respect to the querying user if, for example, the cosine similarity between their respective user-vectors is above a threshold similarity value. As an example and not by way of limitation, a user a user Alex may be a Mexican-American male, aged 24, who attends Stanford University, and who has liked the Tim Duncan fan page, and has checked-in at Umami Burger in Palo Alto, Calif. Each of these pieces of information relating to Alex's social-networking activity may be coded and become part of a user-vector that represents Alex. The social-networking system may create a user-vector for Alex that may look something like, <2, 5, 0, 0, 3, −2>, where each value in the user-vector represents some social-networking trait (e.g., 2=male, 5=age 21-25; −2=likes Tim Duncan). This user-vector may have more or fewer dimensions depending on the number of social-networking traits considered when determining lookalikes and the amount of information available to the social-networking system. If two users have a vector similarity value above a threshold similarity value (e.g., a cosine similarity greater than 0.7), they may be deemed to be lookalike users. Depending on the threshold, the querying user may have tens, hundreds, or thousands of lookalike users. Thus, in particular embodiments, each user-vector is an N-dimensional vector representing the respective user in an N-dimensional vector space. Each dimension of the user-vector may correspond to a social-networking trait of the respective user. In particular embodiments, each lookalike user may be selected based on a vector similarity between the first user-vector and the second-user vector corresponding to the lookalike user. Using data from a first user's lookalike users may allow the social-networking system to more accurately predict whether the first user will convert on a particular message and offer. Although this disclosure describes using lookalike user data in a particular manner, this disclosure contemplates using lookalike user data in any suitable manner. More information on identifying lookalike users and using the associated data to make predictions is disclosed in U.S. patent application Ser. No. 15/337,832, entitled "Ranking Search Results Based on Lookalike Users on Online Social Networks" and filed 28 Oct. 2016, which is incorporated herein by reference in its entirety.

In particular embodiments, once the machine-learning model has been trained, user data (e.g., user features) and template elements in a particular version of a notification may be used by the machine-learning model to determine a score for the version of the notification. As an example and not by way of limitation, the social-networking system may take the trained machine-learning model and apply it to a particular user, Alex and a particular version of the notification. The version of the notification may have been auto-generated by the notification engine or it may have been manually created by an administrator of the social-networking system. For example, the version of the notification may be used to create notification 210. In particular embodiments, the machine-learning model may accept as input Alex's user data as well as the one or more template elements of the version of the notification. In the example case of notification 210, the template elements may include <actor name> 212, <action> 213, <object type> 214, <location> 215, <context item> 216, and <content object media> 217. In particular embodiments, the machine-learning model may output a probability score for each of the different versions of the notification. As an example and not by way of limitation, the social-networking system may determine the probability that Alex will have a positive interaction with the notification version corresponding to the notification 210 is 0.7. A different version of the notification (e.g., one that omits content object media 217) may receive a score of 0.65. In particular embodiments, the social-networking system may select the version of the notification that is associated with the highest positive interaction probability (e.g., click through, view the notification for a threshold amount of time, open an associated application after viewing the notification). Although this disclosure describes determining a score for a version of a notification in a particular manner, this disclosure contemplates determining a score for a version of a notification in any suitable manner.

In particular embodiments, the machine-learning model may be trained using past actions of one or more users of the online social network with respect to a plurality of notifications sent to the respective client devices of the one or more users. In particular embodiments, the machine-learning model may be trained using past actions of a single user. In this case, a new machine-learning model may be generated for each user of the online social network. As an example and not by way of limitation, a user, Alex, may have received 1,000 notifications over a previous amount of time (e.g., the past 90 days). The machine-learning model may use as training data Alex's user data and the data comprised in the 1,000 notifications (e.g., the template element information) that Alex has received. Although this disclosure describes training a machine-learning model in a particular manner, this disclosure contemplates training a machine-learning model in any suitable manner.

In particular embodiments, the social-networking system may select one of the versions of the notification based on the associated scores for the versions of the notifications. In particular embodiments, the version with the highest score may be the version that is selected. In particular embodiments, the selection may be based on the score and on one or more other constraints, such as space constraints (e.g., there may not be room on the display screen of the recipient's client device to include a context item 216 and a content object media 217). Thus, even if a particular version receives a higher score than other versions, it may nevertheless be passed over for selection. In particular embodiments the social-networking system may identify the versions of the notification that have scores over a threshold score (e.g., 0.40). Then the social-networking system may base the selection on other factors, such as affinity between the receiving user and the actor, how active the user is in the group associated with the notification (if applicable), or any other suitable factor. Although this disclosure describes selecting a version of a notification in a particular manner, this disclosure contemplates selecting a version of a notification in any suitable manner.

In particular embodiments, the social-networking system may generate a personalized notification by using the selected version of the notification and replacing each of the one or more template elements of the selected version of the notification with content of the content type associated with the template element. In particular embodiments, the content comprises a name of the first user, a name of an actor associated with the particular notification, an action associated with the particular notification and performed by the actor through the online social network, a content object associated with the notification, or a portion of text written by the actor. In particular embodiments, the actor may be a second user of the online social network. As an example and not by way of limitation, the selected version of the notification may have the following template elements: <User Name>; <Actor Name>; <Action>; <Context1>, <Context2>; <Prompt>. To replace each of these template elements with content of the content type associated with the respective template element, the social-networking system may replace each template element with an appropriate content. As an example and not by way of limitation the template elements <User Name>; <Actor Name>; <Action>; <Context1>, <Context2>; <Prompt> may be replaced with <"Kevin">, <"Tom">; <"shared>; <"a photo">; <"Taxidermy">; <"Click to view!">. Thus, the text of the notification may state, "Kevin, Tom just shared a photo in Taxidermy. Click to view!" Although this disclosure describes generating a personalized notification in a particular manner, this disclosure contemplates generating a personalized notification in any suitable manner.

In particular embodiments, the social-networking system may send the personalized notification to a client device of the user. In particular embodiments, the personalized notification may be delivered to the user in a user-aware manner. The personalized notification may be sent through one or more delivery channels, e.g., sent by one or more communication media (e.g., SMS, MMS, email, application, voice) to one or more unique endpoints (e.g., a telephone number, an email address, a particular client device as specified by a unique device identifier). In particular embodiments, the social-networking system may utilize different techniques to attempt to provide the personalized notification to the user in a manner that increases the likelihood that the user will interact with the notification (e.g., a "click-through" action whereby the user clicks on a link presented in a visual notification presenting promotional content, which then brings up a third-party website on the user's screen), which hopefully increases the likelihood that a "conversion" takes place—that the user takes some final action that is the ultimate goal of delivering the notification (e.g., completes an action, such as a registration, content consumption, or a purchase, on the third-party website). Although this disclosure describes sending a personalized notification in a particular manner, this disclosure contemplates sending a personalized notification in any suitable manner.

In particular embodiments, a policy engine associated with the social-networking system may assess a number of different factors in order to determine delivery instructions for the personalized notification. For any particular notification, the policy engine may assess not only (1) information associated with the notification (e.g., the source, the content, or the format) and (2) information associated with a particular user (e.g., demographic information for the user, the user's location, the user's available delivery channels and the status thereof, the user's current delivery context, user profile information, or social-networking information for the user), but also (3) historical notification information about this particular user's responses to past notifications (e.g., conversion rates for different notification/context/delivery patterns) and about prior context/delivery patterns (if any) for the current notification (and interaction levels, if any, for those prior context/delivery patterns). In connection with sending notifications to users, particular embodiments may utilize one or more systems, components, elements, functions, methods, operations, or steps disclosed in U.S. patent application Ser. No. 14/567,218, entitled "User Aware Notification Delivery" and filed 11 Dec. 2014, which is hereby incorporated by reference in its entirety. Although this disclosure describes sending a personalized notification in a particular manner, this disclosure contemplates sending a personalized notification in any suitable manner.

Figure 3:
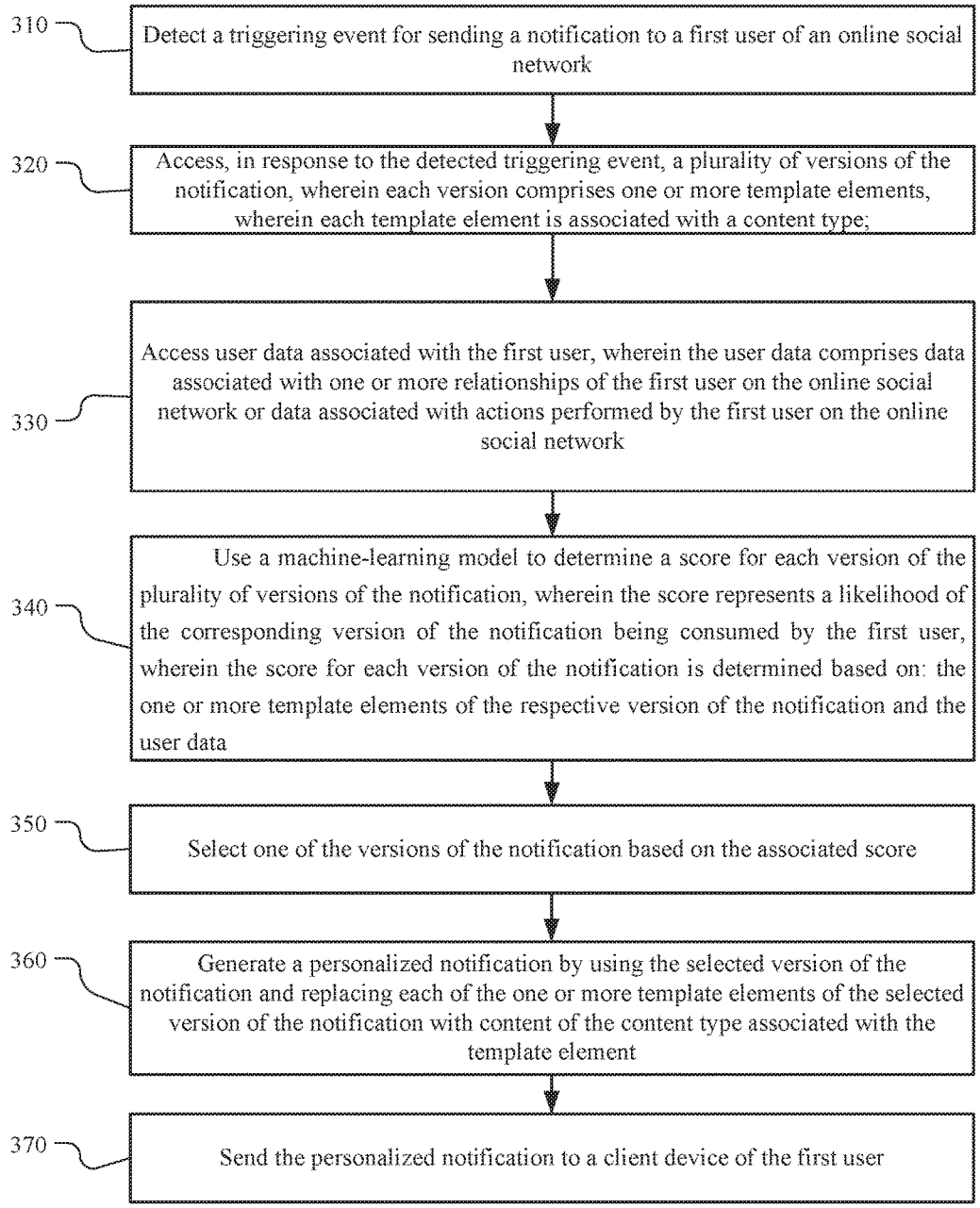
FIG. 3 illustrates an example method for delivering personalized notifications to a user of a communications network.

FIG. 3 illustrates an example method 300 for delivering personalized notifications to a user. The method may begin at step 310, where one or more computing devices may detect a triggering event for sending a notification to a first user of an online social network. At step 320, one or more computing devices may access, in response to the detected triggering event, a plurality of versions of the notification, wherein each version comprises one or more template elements, wherein each template element is associated with a content type. At step 330, one or more computing devices may access user data associated with the first user, wherein the user data comprises data associated with one or more relationships of the first user on the online social network or data associated with actions performed by the first user on the online social network. At step 340, one or more computing devices may use a machine-learning model to determine a score for each version of the plurality of versions of the notification, wherein the score represents a likelihood of the corresponding version of the notification being consumed by the first user, wherein the score for each version of the notification is determined based on: (1) the one or more template elements of the respective version of the notification, and (2) the user data. At step 350, one or more computing devices may select one of the versions of the notification based at least in part on its associated score. At step 360, one or more computing devices may generate a personalized notification by using the selected version of the notification and replacing each of the one or more template elements of the selected version of the notification with content of the content type associated with the template element. At step 370, one or more computing devices may send the personalized notification to a client device of the first user. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for delivering personalized notifications to a user including the particular steps of the method of FIG. 3, this disclosure contemplates any suitable method for delivering personalized notifications to a user including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
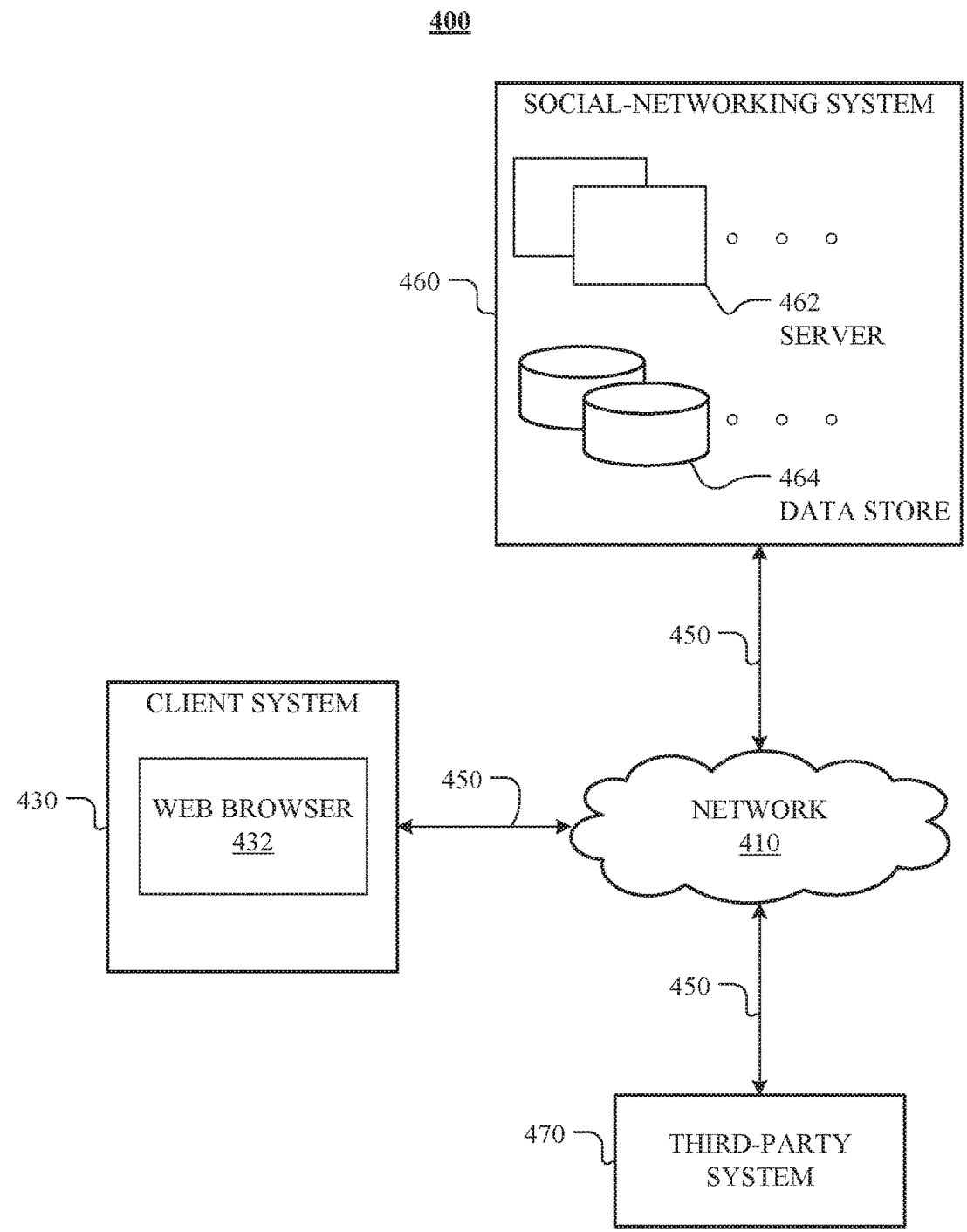
FIG. 4 illustrates an example network environment associated with a social-networking system.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of client system 430, social-networking system 460, third-party system 470, and network 410, this disclosure contemplates any suitable arrangement of client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client system 430, social-networking systems 460, third-party systems 470, and networks 410.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 430. A client system 430 may enable a network user at client system 430 to access network 410. A client system 430 may enable its user to communicate with other users at other client systems 430.

In particular embodiments, client system 430 may include a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 430 may enter a Uniform Resource Locator (URL) or other address directing the web browser 432 to a particular server (such as server 462, or a server associated with a third-party system 470), and the web browser 432 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. As an example and not by way of limitation, client system 430 may access social-networking system 460 using a web browser 432, or a native application associated with social-networking system 460 (e.g., a mobile social-networking application, a messaging application, another suitable application, or any combination thereof) either directly or via network 410. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (e.g., relationships) to a number of other users of social-networking system 460 to whom they want to be connected. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 410.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 470 via network 410. The web server may include a mail server or other messaging functionality for receiving and routing messages between social-networking system 460 and one or more client systems 430. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in to or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Figure 5:
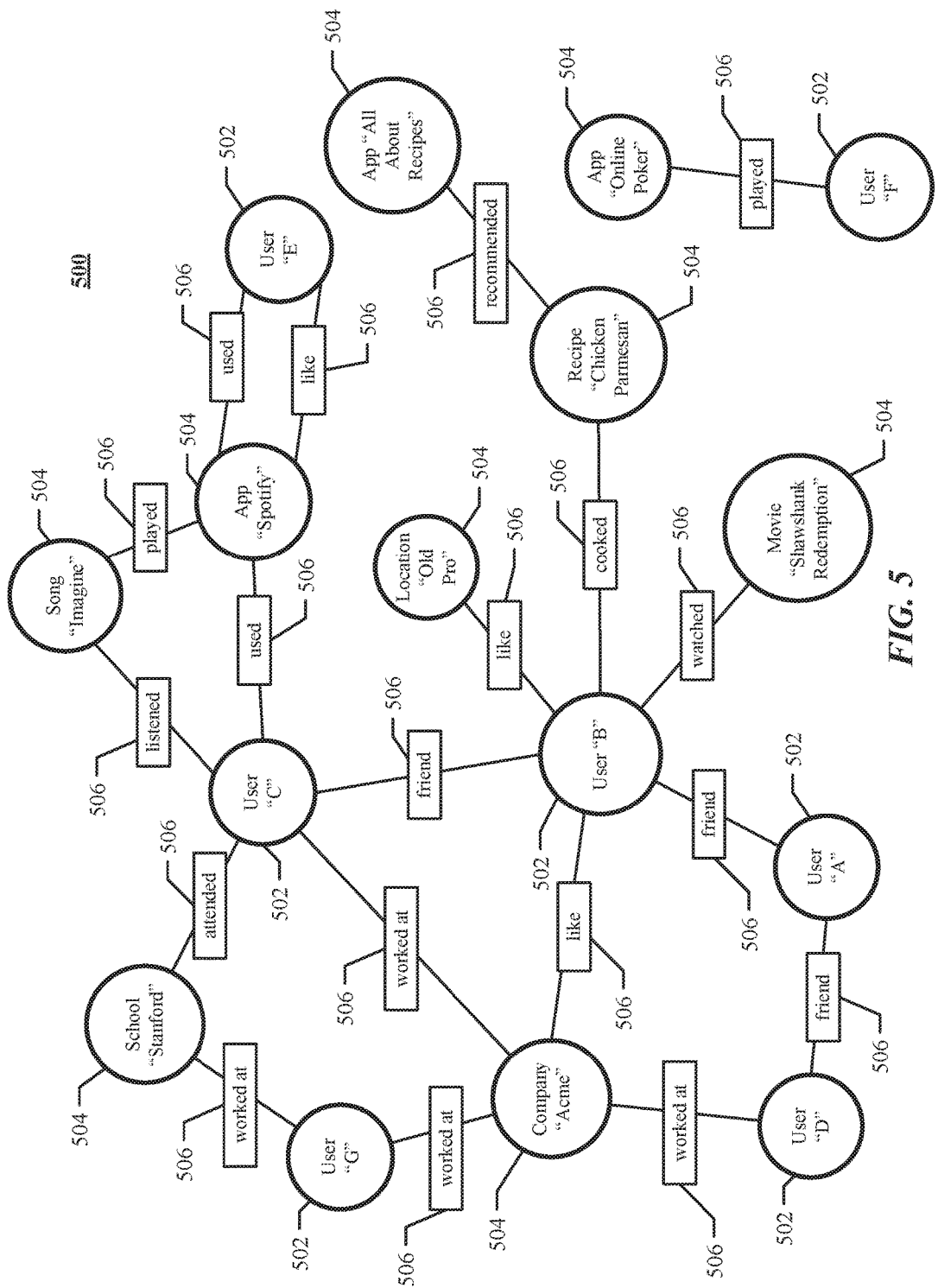
FIG. 5 illustrates an example social graph.

FIG. 5 illustrates example social graph 500. In particular embodiments, social-networking system 460 may store one or more social graphs 500 in one or more data stores. In particular embodiments, social graph 500 may include multiple nodes—which may include multiple user nodes 502 or multiple concept nodes 504—and multiple edges 506 connecting the nodes. Example social graph 500 illustrated in FIG. 5 is shown, for didactic purposes, in a two-dimensional visual map representation. In particular embodiments, a social-networking system 460, client system 430, or third-party system 470 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 460. As an example and not by way of limitation, a user may be an individual (human user), an entity (e.g., an enterprise, business, or third-party application), or a group (e.g., of individuals or entities) that interacts or communicates with or over social-networking system 460. In particular embodiments, when a user registers for an account with social-networking system 460, social-networking system 460 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 460. In particular embodiments, a user node 502 may be associated with information provided by a user or information gathered by various systems, including social-networking system 460. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 460 or a third-party website associated with a web-application server); an entity (such as, for example, a person, business, group, sports team, or celebrity); a resource (such as, for example, an audio file, video file, digital photo, text file, structured document, or application) which may be located within social-networking system 460 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 504 may be associated with information of a concept provided by a user or information gathered by various systems, including social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 460. Profile pages may also be hosted on third-party websites associated with a third-party system 470. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 470. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 430 to send to social-networking system 460 a message indicating the user's action. In response to the message, social-networking system 460 may create an edge (e.g., a check-in-type edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 460 may send a "friend request" to the second user. If the second user confirms the "friend request," social-networking system 460 may create an edge 506 connecting the first user's user node 502 to the second user's user node 502 in social graph 500 and store edge 506 as social-graph information in one or more of data stores 464. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to an edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 460 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 460 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 460 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, social-networking system 460 may create an edge 506 between a user node 502 and a concept node 504 in social graph 500. As an example and not by way of limitation, a user viewing a concept-profile page (such as, for example, by using a web browser or a special-purpose application hosted by the user's client system 430) may indicate that he or she likes the concept represented by the concept node 504 by clicking or selecting a "Like" icon, which may cause the user's client system 430 to send to social-networking system 460 a message indicating the user's liking of the concept associated with the concept-profile page. In response to the message, social-networking system 460 may create an edge 506 between user node 502 associated with the user and concept node 504, as illustrated by "like" edge 506 between the user and concept node 504. In particular embodiments, social-networking system 460 may store an edge 506 in one or more data stores. In particular embodiments, an edge 506 may be automatically formed by social-networking system 460 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

In particular embodiments, social-networking system 460 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 470 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 460 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 460 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 460 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 460 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 460 may calculate a coefficient based on a user's actions. Social-networking system 460 may monitor such actions on the online social network, on a third-party system 470, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 460 may calculate a coefficient based on the user's actions with particular types of content. The content may be associated with the online social network, a third-party system 470, or another suitable system. The content may include users, profile pages, posts, news stories, headlines, instant messages, chat room conversations, emails, advertisements, pictures, video, music, other suitable objects, or any combination thereof. Social-networking system 460 may analyze a user's actions to determine whether one or more of the actions indicate an affinity for subject matter, content, other users, and so forth. As an example and not by way of limitation, if a user frequently posts content related to "coffee" or variants thereof, social-networking system 460 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 460 may calculate a coefficient based on the type of relationship between particular objects. Referencing the social graph 500, social-networking system 460 may analyze the number and/or type of edges 506 connecting particular user nodes 502 and concept nodes 504 when calculating a coefficient. As an example and not by way of limitation, user nodes 502 that are connected by a spouse-type edge (representing that the two users are married) may be assigned a higher coefficient than a user nodes 502 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 460 may determine that the user has a higher coefficient with respect to the first photo than the second photo because having a tagged-in-type relationship with content may be assigned a higher weight and/or rating than having a like-type relationship with content. In particular embodiments, social-networking system 460 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 460 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 500. As an example and not by way of limitation, social-graph entities that are closer in the social graph 500 (i.e., fewer degrees of separation) may have a higher coefficient than entities that are further apart in the social graph 500.

In particular embodiments, social-networking system 460 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 430 of the user). A first user may be more interested in other users or concepts that are closer to the first user. As an example and not by way of limitation, if a user is one mile from an airport and two miles from a gas station, social-networking system 460 may determine that the user has a higher coefficient for the airport than the gas station based on the proximity of the airport to the user.

In particular embodiments, social-networking system 460 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 460 may provide information that is relevant to user's interests and current circumstances, increasing the likelihood that they will find such information of interest. In particular embodiments, social-networking system 460 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 460 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 460 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 470 (e.g., via an API or other communication channel), or from another suitable system. In response to the request, social-networking system 460 may calculate the coefficient (or access the coefficient information if it has previously been calculated and stored). In particular embodiments, social-networking system 460 may measure an affinity with respect to a particular process. Different processes (both internal and external to the online social network) may request a coefficient for a particular object or set of objects. Social-networking system 460 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 6:
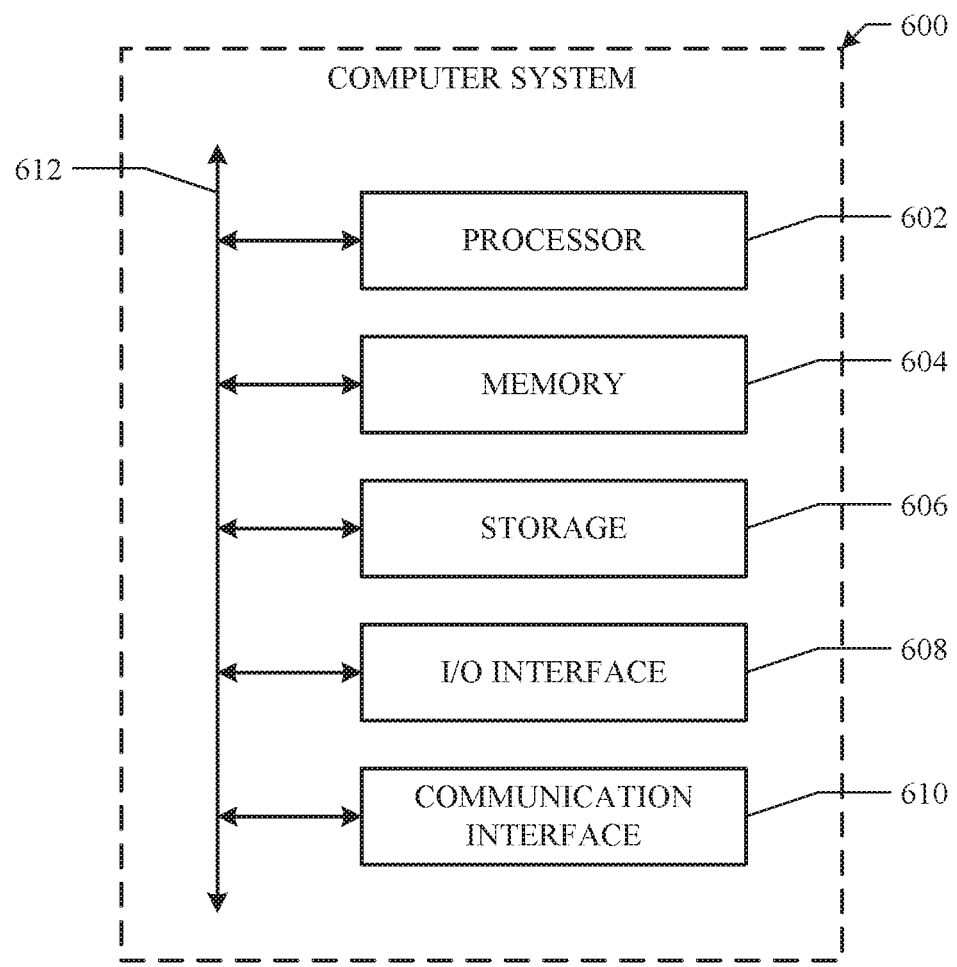
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a computing system associated with a network of users, detecting a triggering event associated with a first user of the network for sending a notification to one or more recipient users of the network;
    by the computing system, accessing, in response to the detected triggering event, a plurality of versions of the notification, wherein each version comprises one or more template elements, wherein each template element is associated with a content type;
    by the computing system, accessing user data associated with the one or more recipient users, wherein the user data comprises data associated with one or more relationships of the one or more recipient users on the network or data associated with actions performed by the one or more recipient users on the network;
    by the computing system, using a machine-learning model to determine a consumption-likelihood score for each version of the plurality of versions of the notification, wherein the consumption-likelihood score represents a likelihood of the corresponding version of the notification being consumed by the one or more recipient users, wherein the consumption-likelihood score for each version of the notification is determined based on:
        the one or more template elements of the respective version of the notification; and
        the user data;
    by the computing system, selecting one of the versions of the notification based on the associated consumption-likelihood score;
    by the computing system, generating a personalized notification by using the selected version of the notification and replacing each of the one or more template elements of the selected version of the notification with content of the content type associated with the template element; and
    by the computing system, sending the personalized notification to a client device of each of the one or more recipient users.

2. The method of claim 1, wherein the content comprises a name of the one or more recipient users, a name of an actor associated with the particular notification, an action associated with the particular notification and performed by the actor through the network, a content object associated with the notification, or a portion of text written by the actor; wherein the actor is a second user of the network.

3. The method of claim 1, wherein the user data is obtained using a social graph associated with the one or more recipient users, the social graph comprising:
    a plurality of nodes and edges connecting the nodes;
    a first node of the plurality of nodes corresponding to a particular one of the one or more recipient users; and
    one or more second nodes of the plurality of nodes corresponding to second users, entities, or concepts that the particular one of the one or more recipient users has interacted with on the network, wherein each edge between the first node and each second node corresponds to an action the particular one of the one or more recipient users has taken with respect to the second user corresponding to the second node.

4. The method of claim 1, wherein the machine-learning model is trained using user data from users who are lookalike users with respect to the one or more recipient users.

5. The method of claim 1, wherein the machine-learning model is trained using past actions of one or more users of the network performed in response to a plurality of notifications sent to one or more client devices of the one or more users.

6. The method of claim 1, wherein the user data comprises:
- social graph information comprising one or more nodes corresponding to concepts, entities, or users that the one or more recipient users have interacted with; and
- past actions of the one or more recipient users with respect to a plurality of notifications sent to the client device of each of the one or more recipient users.

7. The method of claim 1, wherein the data associated with actions performed by the one or more recipient users on the network comprise actions the one or more recipient users have performed in response to receiving a plurality of notifications from the network.

8. One or more computer-readable non-transitory storage media embodying software that is operable when executed to:
- detect a triggering event associated with a first user of a network for sending a notification to one or more recipient users of the network;
- access, in response to the detected triggering event, a plurality of versions of the notification, wherein each version comprises one or more template elements, wherein each template element is associated with a content type;
- access user data associated with the one or more recipient users, wherein the user data comprises data associated with one or more relationships of the one or more recipient users on the online social network or data associated with actions performed by the one or more recipient users on the network;
- use a machine-learning model to determine a consumption-likelihood score for each version of the plurality of versions of the notification, wherein the consumption-likelihood score represents a likelihood of the corresponding version of the notification being consumed by the one or more recipient users, wherein the consumption-likelihood score for each version of the notification is determined based on:
  - the one or more template elements of the respective version of the notification; and
  - the user data;
- select one of the versions of the notification based on the associated consumption-likelihood score;
- generate a personalized notification by using the selected version of the notification and replacing each of the one or more template elements of the selected version of the notification with content of the content type associated with the template element; and
- send the personalized notification to a client device of each of the one or more recipient users.

9. The media of claim 8, wherein the content comprises a name of the one or more recipient users, a name of an actor associated with the particular notification, an action associated with the particular notification and performed by the actor through the network, a content object associated with the notification, or a portion of text written by the actor; wherein the actor is a second user of the network.

10. The media of claim 8, wherein the user data is obtained using a social graph associated with the one or more recipient users, the social graph comprising:
- a plurality of nodes and edges connecting the nodes;
- a first node of the plurality of nodes corresponding to a particular one of the one or more recipient users; and
- one or more second nodes of the plurality of nodes corresponding to second users, entities, or concepts that the particular one of the one or more recipient users has interacted with on the network, wherein each edge between the first node and each second node corresponds to an action the particular one of the one or more recipient users has taken with respect to the second user corresponding to the second node.

11. The media of claim 8, wherein the machine-learning model is trained using user data from users who are lookalike users with respect to the one or more recipient users.

12. The media of claim 8, wherein the machine-learning model is trained using past actions of one or more users of the network performed in response to a plurality of notifications sent to one or more client devices of the one or more users.

13. The media of claim 8, wherein the user data comprises:
- social graph information comprising one or more nodes corresponding to concepts, entities, or users that the one or more recipient users have interacted with; and
- past actions of the one or more recipient users with respect to a plurality of notifications sent to the client device of each of the one or more recipient users.

14. The media of claim 8, wherein the data associated with actions performed by the one or more recipient users on the network comprise actions the one or more recipient users have performed in response to receiving a plurality of notifications from the network.

15. A system comprising:
- one or more processors; and
- one or more computer-readable non-transitory storage media coupled to one or more of the processors and comprising instructions operable when executed by one or more of the processors to cause the system to:
  - detect a triggering event associated with a first user of a network for sending a notification to one or more recipient users of the network;
  - access, in response to the detected triggering event, a plurality of versions of the notification, wherein each version comprises one or more template elements, wherein each template element is associated with a content type;
  - access user data associated with the one or more recipient users, wherein the user data comprises data associated with one or more relationships of the one or more recipient users on the network or data associated with actions performed by the one or more recipient users on the network;
  - use a machine-learning model to determine a consumption-likelihood score for each version of the plurality of versions of the notification, wherein the consumption-likelihood score represents a likelihood of the corresponding version of the notification being consumed by the one or more recipient users, wherein the consumption-likelihood score for each version of the notification is determined based on:
    - the one or more template elements of the respective version of the notification; and
    - the user data;
  - select one of the versions of the notification based on the associated consumption-likelihood score;
  - generate a personalized notification by using the selected version of the notification and replacing each of the one or more template elements of the selected version of the notification with content of the content type associated with the template element; and
  - send the personalized notification to a client device of each of the one or more recipient users.

16. The system of claim 15, wherein the content comprises a name of the one or more recipient users, a name of an actor associated with the particular notification, an action associated with the particular notification and performed by the actor through the network, a content object associated with the notification, or a portion of text written by the actor; wherein the actor is a second user of the network.

17. The system of claim 15, wherein the user data is obtained using a social graph associated with the one or more recipient users, the social graph comprising:
   a plurality of nodes and edges connecting the nodes;
   a first node of the plurality of nodes corresponding to a particular one of the one or more recipient users; and
   one or more second nodes of the plurality of nodes corresponding to second users, entities, or concepts that the particular one of the one or more recipient users has interacted with on the network, wherein each edge between the first node and each second node corresponds to an action the particular one of the one or more recipient users has taken with respect to the second user corresponding to the second node.

* * * * *